March 1, 1949. J. F. O'BRIEN ET AL 2,462,892
REVERSE CURRENT CIRCUIT BREAKER
Filed Aug. 28, 1943
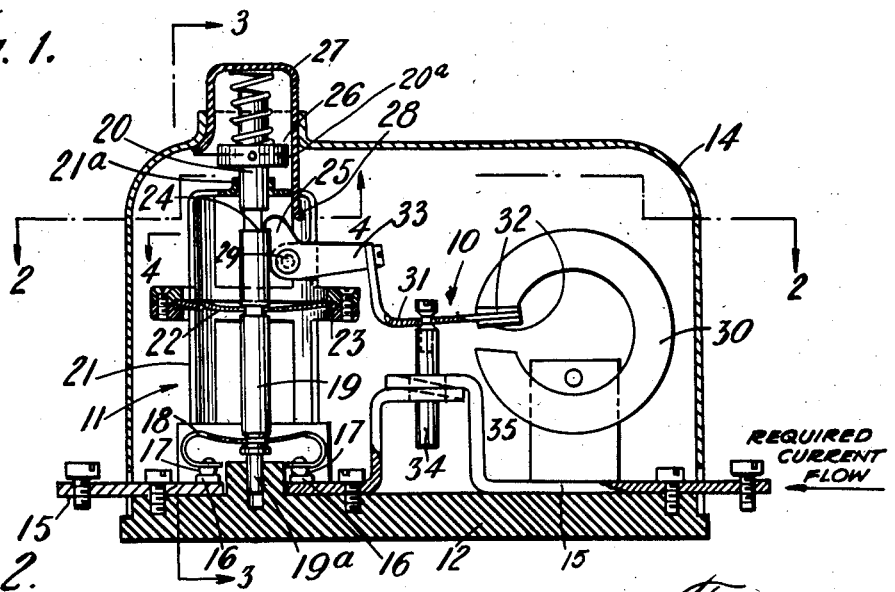
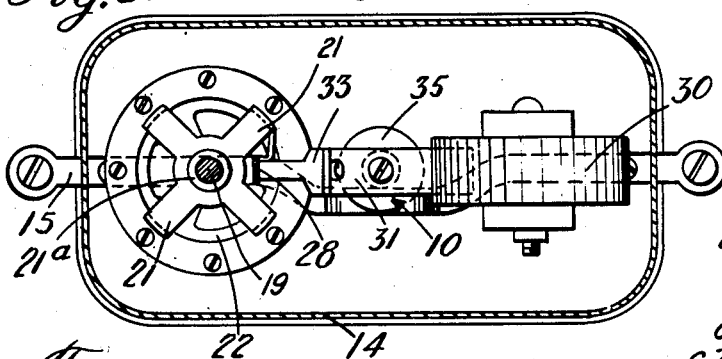
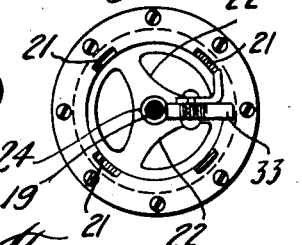
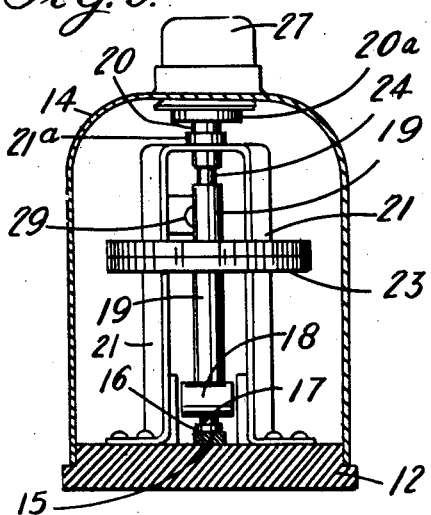
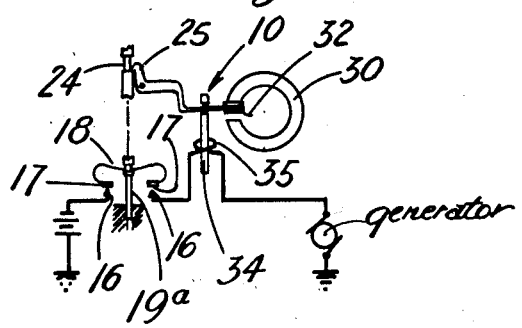
INVENTOR
JOHN B. CATALDO
JOSEPH F. O'BRIEN
ATTORNEY Patented Mar. 1, 1949

2,462,892

UNITED STATES PATENT OFFICE 2,462,892

REVERSE CURRENT CIRCUIT BREAKER

Joseph F. O'Brien, Jersey City, and John B. Cataldo, Summit, N. J., assignors to John B. Pierce Foundation, New York, N. Y., a corporation of New York Application August 28, 1943, Serial No. 500,384

2 Claims. (Cl. 200—106)

1

The invention relates to electrical circuit breakers and particularly to reverse current circuit breakers, applicable particularly for direct current electrical circuits comprising an electric generator and a storage battery charged by the electric generator.

In particular, the invention relates to means to open the electrical connection of the generator to the main battery on reversal of flow of current, to prevent the generator from being driven, as a motor, from the battery.

It is an object of the invention, therefore, to provide means whereby a generator, for example, may be disconnected from the circuit upon a reversal of direction of current flow.

It is an object of the invention to provide a reverse current circuit breaker to automatically open a circuit upon reversal of the direction of flow of current.

It is an object of the invention to provide a reverse current circuit breaker which is simple in construction and operation, and which may be reduced to minimum size and weight, and low cost.

In the accompanying drawings:

Fig. 1 is a side elevation, partly in section, of one form of reverse current circuit breaker embodying the present invention;

Fig. 2 is a horizontal sectional view taken on the line 2—2 of Fig. 1;

Fig. 3 is a vertical end elevation, partly in section, on the lines 3—3 of Fig. 1;

Fig. 4 is a horizontal sectional view of the mechanically latched switch taken on lines 4—4 of Fig. 1;

Fig. 5 is a wiring diagram of the circuit breaker of Fig. 1.

Referring to the drawings, and particularly to the embodiment shown in Figs. 1 through 4, a mechanically latched reverse current circuit breaker embodying the present invention comprises a reverse current trip 10 and a mechanically latched switch 11 suitably supported on a base 12 of insulation material and desirably contained within a suitable housing 14.

Positioned upon the base 12 is a main bus 15 of a direct current electrical circuit connecting a storage battery with the positive terminal of an electrical generator, as shown in Fig. 5. The bus 15 is not continuous, being provided with main contacts 16, 16 arranged to be closed by a movable contact in which cooperating contact points 17, 17 are fixed to the ends of a spring structure 18, as shown. Fig. 1 shows the circuit completed through the bus 15, thereby connecting the respective positive terminals of the generator and the storage battery.

The spring structure 18 is carried by a vertically slidable switch rod 19, a pilot end 19a of which extends into a suitable guiding aperture in the base 12, as indicated in Fig. 1, and the upper end 20 of which is journaled within a collar 21a formed at the upper end 21a of a supporting structure 21. Intermediate the respective ends of the switch rod 19 the switch rod is engaged by the hub of a snap spring 22 which may be in the form of a spoked, dished disc, see Fig. 4, the periphery of which is confined within a suitable rim 23 of the support 21. The snap spring is desirably of the type described and claimed in U. S. application Serial No. 441,382, now abandoned, filed May 1, 1942, by William E. Stilwell, Jr., entitled Toggle springs, characteristics of said snap spring being that it has two positions of stable equilibrium, and it will throw from one to the other of said positions under the influence of movement less than that required to move the hub through its dead center position.

It will be understood that the switch rod 19 may be made in two parts, to permit it to be passed through the spring 22.

At any suitable position along the length of the switch rod 19, said switch rod is cut to provide a sharp shoulder 24 for cooperation with the nose of a latch 25, as later explained. The upper terminus of the switch rod 19 carries a collar 20a which serves as a base for a spring biased manual control button 27, a downwardly extending spring portion 28 of which provides a spring detent which, when the button 27 is depressed, engages the adjacent surface of the latch 25 and rotates it about its pivot 29 in the direction of switch rod 19, to place the latch 25 in latching position relative to the shaft 19.

It will be noted from Fig. 1 that with the contacts 17, 17 in closed circuit relationship with the contacts 16, 16, the spring 18 is stressed downwardly, thereby exerting an upward reactional force on the switch rod 19. In such stressed state, the spring 18 is of sufficient force to overcome the stable equilibrium of the snap spring 22; and were it not for the engagement of the latch 25 with the shoulder 24, the spring 18 would move switch rod 19 upwardly, to cause the snap spring to throw to its opposite position.

The design of spring 18 is such, however, that its throw extent is sufficient to move the switch rod 19 and hub of spring 22 enough to cause the snap spring 22 to complete its throw to its opposite position of equilibrium, in which position, it raises the contacts 17 out of engagement with contacts 16, opening the bus 15. To open the bus contacts, therefore, the latch 25 must first have been rotated out of engagement with the shoulder 24 of switch rod 19. To re-close the circuit, the operator must press downwardly on the button 27 until the nose of the latch 25 again snaps over the shoulder at 24, whereupon the snap spring 22 is thrown to its Fig. 1 position and the contacts 16, 17 are again in closed circuit relationship. The upward reaction of the spring 18 maintains the engagement of latch 25 with shoulder 24.

The reverse current release 10 comprises a permanent magnet 30, suitably mounted upon the base 12 and a soft iron clapper 31, both faces of one end of which are provided with a layer 32 of non-magnetic material, said clapper 31 being fixed to the arm 33 of the latch 25. The latch assumes the characteristics of a pivoted bell crank and permits the soft iron clapper 31 to be rotated within the gap between the poles of the permanent magnet 30. Pivotally secured to said clapper 31 so as to depend therefrom is a soft iron armature 34 which extends through a convolution 35 formed in the bus 15, as shown in Figs. 1 and 2.

The required direction of flow of current is from the generator to the battery, or in other words, in the direction indicated in Fig. 1 by the legend "Required current flow." With such flow of current, the magnetic flux created about the convolution 35 of the bus bar, through which the armature 34 passes, gives to the clapper 31 a polarity opposite to the magnetic polarity of the upper pole of the fixed magnet 30, thereby maintaining the latch 25 in its Fig. 1 position. If, however, reverse current occurs, namely, a current flow from battery to generator, the polarity of the end of the clapper 31 is reversed so that its polarity is the same as the upper pole of magnet 30 in which circumstance the clapper 31 is repelled from such upper pole and is thrown forcibly against the lower pole of the permanent magnet 30. The resultant rotation of the latch 25 clockwise about its pivot 29 forces the nose of the latch 25 out of engagement with the shoulder 24 in switch rod 19, permitting the spring 18 to urge the switch rod 19 upwardly, whereupon the resulting action of the snap spring 22 completes the upward movement of the switch rod 19 to separate the contacts 16, 16 from the contacts 17, 17, thus opening the bus 15 and disconnecting the battery from the generator.

Whereas we have described our invention by reference to specific forms thereof, it will be understood that many changes and modifications may be made provided they do not depart from the scope of the claims.

We claim:
1. A reverse current circuit breaker comprising in combination a base; load circuit conductors mounted on said base to locate their respective termini in close but spaced adjacency; contact means associated with said termini for connecting and disconnecting said load circuit conductors; switch rod means controlling said contact means; latch means for locking said switch rod means and said contact means in closed-circuit position; resilient means for moving said switch rod means to thereby move said contact means to open-circuit position; electromagnetic means for moving said latch means to its unlatching position relative to said switch rod means, said electromagnetic means comprising a magnet, an arm of magnetizable material connected at one end with said latch means, means for movably mounting said arm to dispose its free end in a path of movement between the poles of said magnet; and convolution means connected with said load circuit conductors and wound and mounted to control the direction of flow of magnetic flux through said arm, whereby under the condition of flow of current reversely in said load circuit conductors, the free end of said arm is repelled by said magnet to thereby release said switch rod means from latching connection with said latch means and thereby permit said resilient means to move said contact means to open-circuit position.

2. A reverse current circuit breaker as defined by claim 1 which is provided with manual operating means for moving said switch rod means and said contact means to closed-circuit position.

JOSEPH F. O'BRIEN.
JOHN B. CATALDO.

REFERENCES CITED

The following references are of record in the file of this patent:

UNITED STATES PATENTS

| Number | Name | Date |
|---|---|---|
| 267,711 | Peck et al. | Nov. 21, 1882 |
| 308,610 | Harvey | Dec. 8, 1884 |
| 374,673 | Griscom | Dec. 13, 1887 |
| 463,192 | Herrick et al. | Nov. 17, 1891 |
| 569,634 | Gharky | Oct. 20, 1896 |
| 630,539 | Hewlett | Aug. 8, 1899 |
| 728,752 | Naphtaly et al. | May 19, 1903 |
| 1,248,084 | Curtis | Nov. 27, 1917 |
| 1,611,741 | Haliburton | Dec. 21, 1926 |
| 1,947,236 | Walle | Feb. 13, 1934 |
| 2,166,327 | Rypinski et al. | July 18, 1939 |
| 2,196,138 | Bullard | Apr. 2, 1940 |
| 2,276,537 | Creveling | Mar. 17, 1942 |
| 2,335,888 | Stilwell | Dec. 7, 1943 |